UNITED STATES PATENT OFFICE.

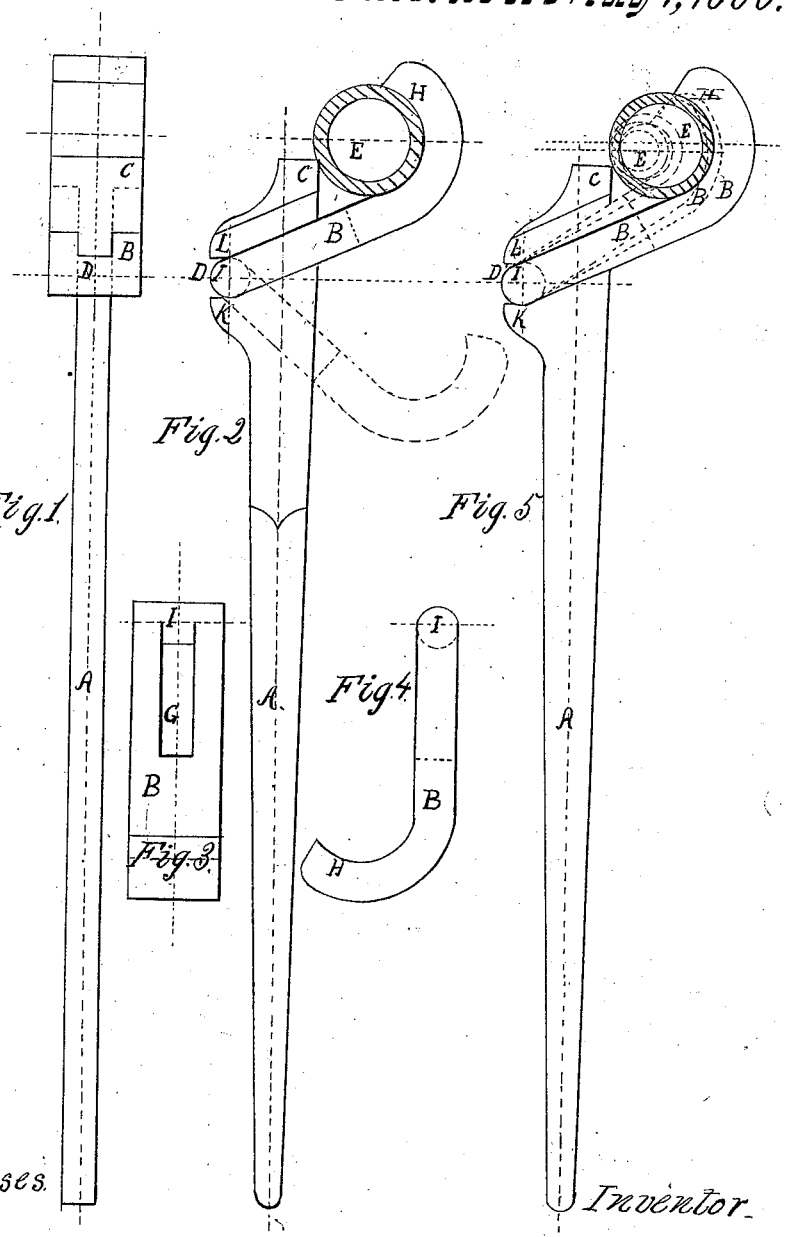

DAVID BANNISTER, OF PHILADELPHIA, PENNSYLVANIA.

IMPROVEMENT IN GAS-PIPE TONGS.

Specification forming part of Letters Patent No. 54,278, dated May 1, 1866.

*To all whom it may concern:*

Be it known that I, DAVID BANNISTER, of the city of Philadelphia, in the State of Pennsylvania, have invented a new and Improved Form of Gas-Pipe Tongs; and I hereby declare the following to be a full and exact description thereof, reference being had to the accompanying drawings, and to the letters of reference marked thereon.

The nature of my invention consists, first, in forming on the lever part of the tongs a sharp edge and a notch and combining therewith a hook for holding the pipe, so that when the latter is embraced for screwing the grip of the tongs on the pipe increases with the force applied to turn it; secondly, the adaptation of different-sized hooks to one lever, thus making the tongs readily adjustable.

To enable others skilled in the art to make and use my invention, I will proceed to describe its construction and operation.

On reference to the accompanying drawings, which form a part of this specification, Figure 1 represents a plan; Fig. 2, an elevation of my improved tongs, showing the part together as in use engaging a pipe to be screwed; Figs. 3 and 4 represent plan and elevation of the hook for holding the pipe; Fig. 5 shows an elevation of the lever with three different-sized hooks, holding three sizes of pipes.

Like letters refer to like parts on the several views.

A represents the lever or handle by which the power is applied to screw the pipe. It is furnished with a sharp, broad, hardened edge, C, which takes a bite on the pipe in the act of screwing. It is also furnished with a notch, D, for holding the hooks B, formed by the two projections K and L on the outer edge of the lever.

B represents the part which holds the pipe to the sharp edge of the lever, which I call the "hook." It is bent at H to fit the curve of the pipe, mortised at G to slip over the lever, and has a round spade-handle joint, I, fitting the notch D.

The location of the notch D on the lever and the length of the hook B are such that when the pipe is engaged, as shown in Fig. 2, the sharp edge C touches the pipe E at a point far enough above a line joining the center of pipe and center of spade-handle I to hold the same from slipping when force is applied to turn the pipe. The inside surface, H, of the hook may be roughened and hardened to cling to the pipes when forced against them.

The ease with which the hook B may be separated from the lever A and other sizes substituted and the facility of alteration and repairs show the advantages of this form of tongs over the more complex kinds in common use.

I consider it a great advantage in this shape of tongs that any blacksmith of ordinary ability can alter, repair, or make new any part of my improved form of tongs, or, indeed, make the whole thing entire from a sketch or drawing. I also consider the ease of adaptability to different-sized pipe within certain limits a great advantage. One lever with the several hooks fitted thereto will supply the place of as many pairs of tongs of the usual form and will perform the same service as existing forms of adjustable tongs, which are more liable to strains and fracture.

Having thus fully described my invention, I claim—

The lever A, with its hardened edge C and notch D, in combination with the hook B, made in the manner and for the purpose specified.

DAVID BANNISTER.

Witnesses:
JOHN H. COOPER,
MAHLON BOLTON.